July 14, 1936.  W. R. HOTCHKISS  2,047,472

AUTOMATIC PERFORATING MACHINE

Filed May 31, 1932  4 Sheets-Sheet 1

Inventor
William Roy Hotchkiss
By
Attorney

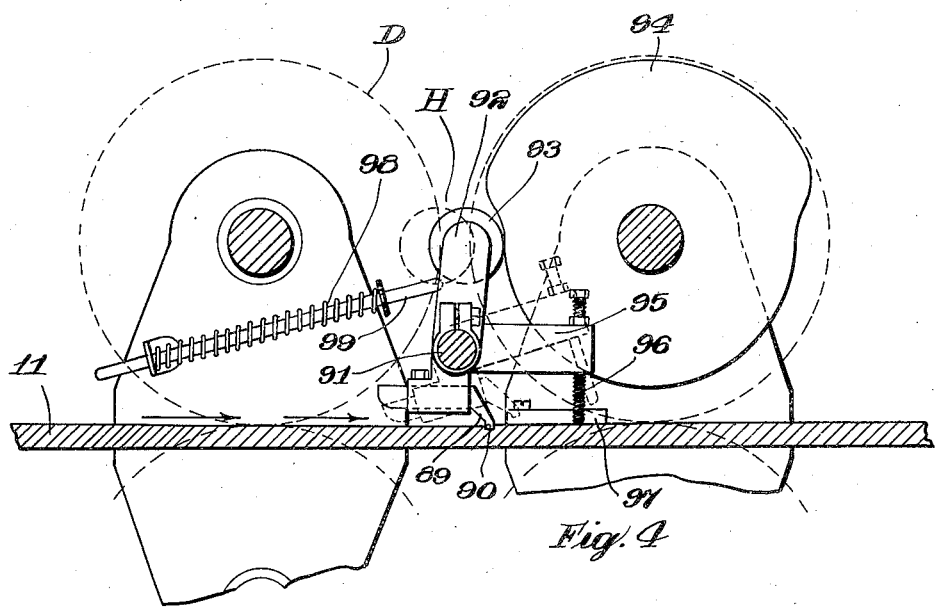
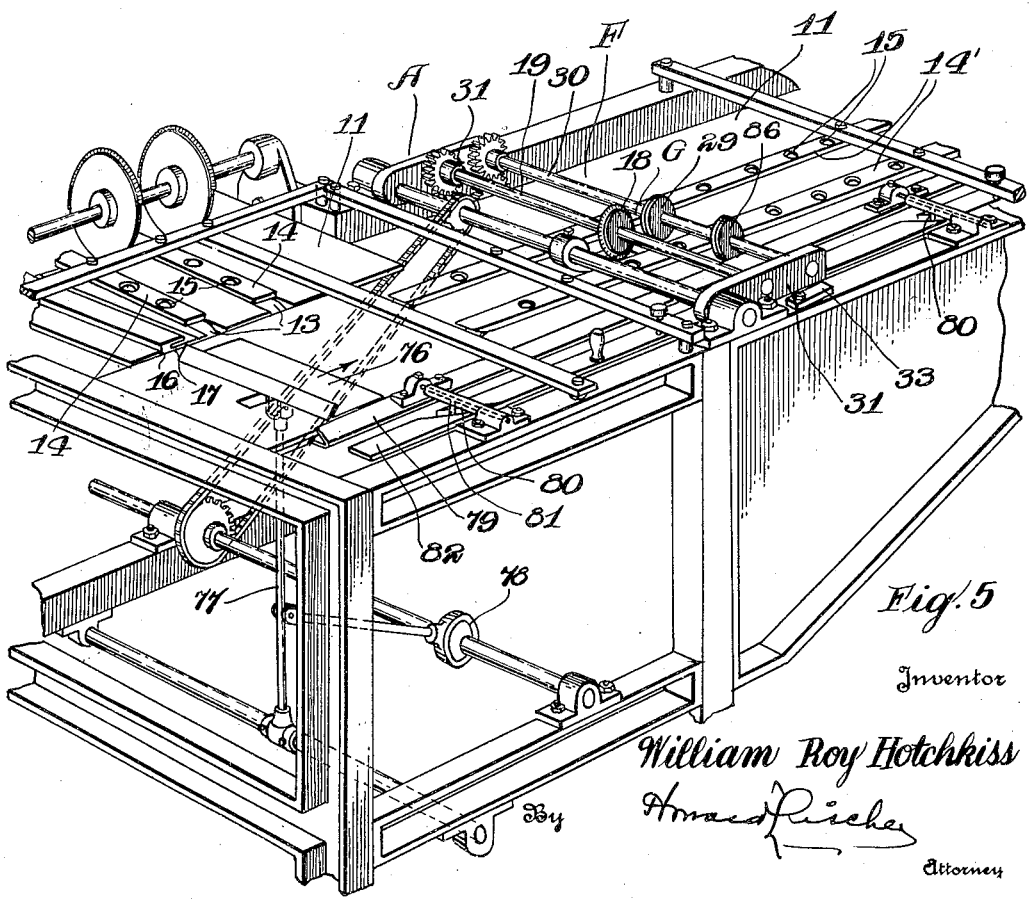

July 14, 1936.　　　W. R. HOTCHKISS　　　2,047,472
AUTOMATIC PERFORATING MACHINE
Filed May 31, 1932　　　4 Sheets-Sheet 3
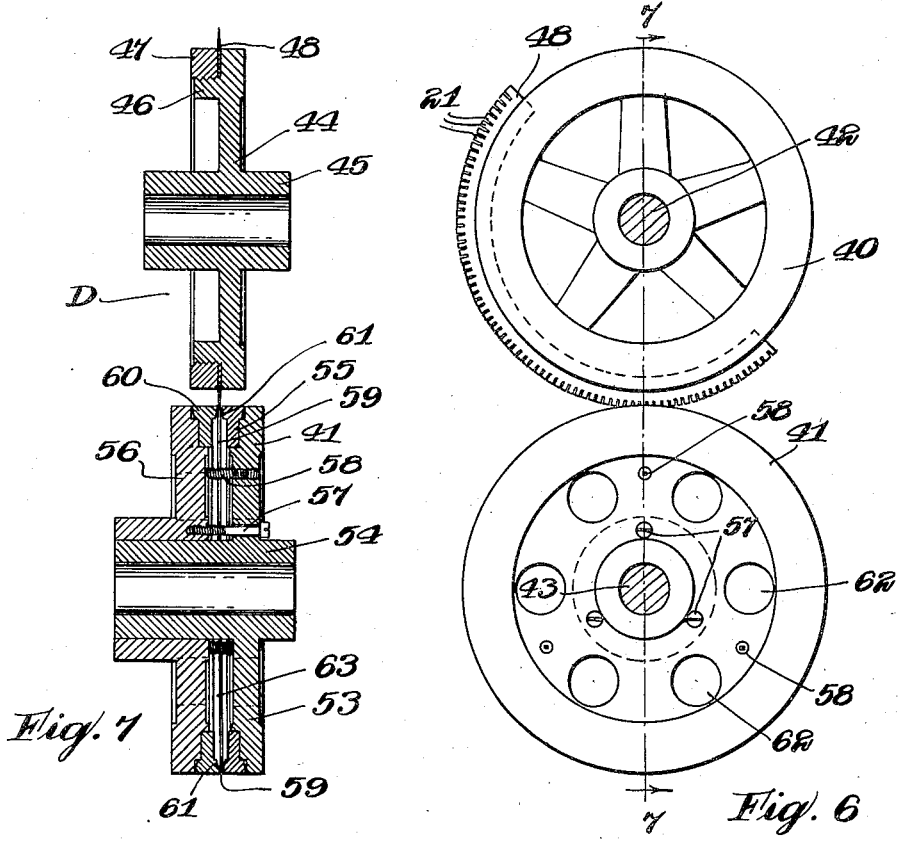
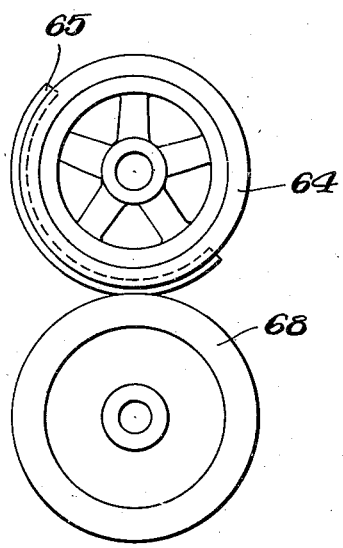
Inventor
William Roy Hotchkiss
By Howard Fischer
Attorney July 14, 1936.  W. R. HOTCHKISS  2,047,472
AUTOMATIC PERFORATING MACHINE
Filed May 31, 1932   4 Sheets-Sheet 4

Inventor
William Roy Hotchkiss
By  Howard Riche
Attorney

Patented July 14, 1936

2,047,472

UNITED STATES PATENT OFFICE 2,047,472

AUTOMATIC PERFORATING MACHINE

William Roy Hotchkiss, St. Paul, Minn.

Application May 31, 1932, Serial No. 614,503

12 Claims. (Cl. 164—99)

This invention relates to an automatic perforator designed to perforate single sheets and to divide the sheets into sections by perforations without separating the same and in a manner to overcome various difficulties that have been apparent heretofore in the perforation of single sheets.

A feature resides in providing a perforating means which cuts a series of slits to form the perforations without removing any material portion of the sheet, together with a clearing means for the cutter which keeps the cutting member clean at all times, thereby providing a more desirable form of perforation through the sheets.

It is also a feature to provide a means of flattening the sheets along the line of perforation so that the sheets may lie more flat, one upon the other in stacking. For example, in the making of bank checks where certain perforations are necessary to separate the check from the stub and to divide the checks one from the other, where several checks are formed on the same sheet of the check book, it is very undesirable to have the sheets bulge along the perforating lines, and this is entirely overcome with my means of perforating and flattening the sheets automatically as they pass through my perforating machine.

My automatic perforator includes means for longitudinally perforating the sheets and also transversely perforating them in rapid succession as they pass through the machine and permitting the perforated sheets to be received and stacked in virtually flat relation, one upon the other. This automatic perforator thus divides the sheets longitudinally where it is desirable to have several divisions upon one sheet, and transversely where such divisions are required, the device being formed with adjustable perforating means as well as larger and smaller perforating members to carry out the principles of automatic perforation, as will be more fully hereinafter defined. The perforators may include segmental sections, if it is desired, which are preferable in certain types of work, and a stripper shoe means may be provided as associated with the perforating member to clear the perforator of the sheet as it passes from the perforating wheel.

These features, with other details and objects will be more fully and clearly defined.

In the drawings forming a part of this specification:

Figure 4 is a detail diagrammatically illustrating the relative operating means for a stop associated with the perforating means of my machine.

Figure 5 is a perspective detail of a portion of my machine.

Figure 6 is a side view of the large segmental perforating wheel and the die wheel operating therewith.

Figure 7 is a section on the line 7—7 of Figure 6.

Figure 8 illustrates the roll-down wheels adapted to operate with the perforating wheels like in Figures 6 and 7, but illustrated in a smaller dimension.

Figure 9 illustrates the upper roll-down wheel of Figure 8, from an edge view thereof.

Figure 1:
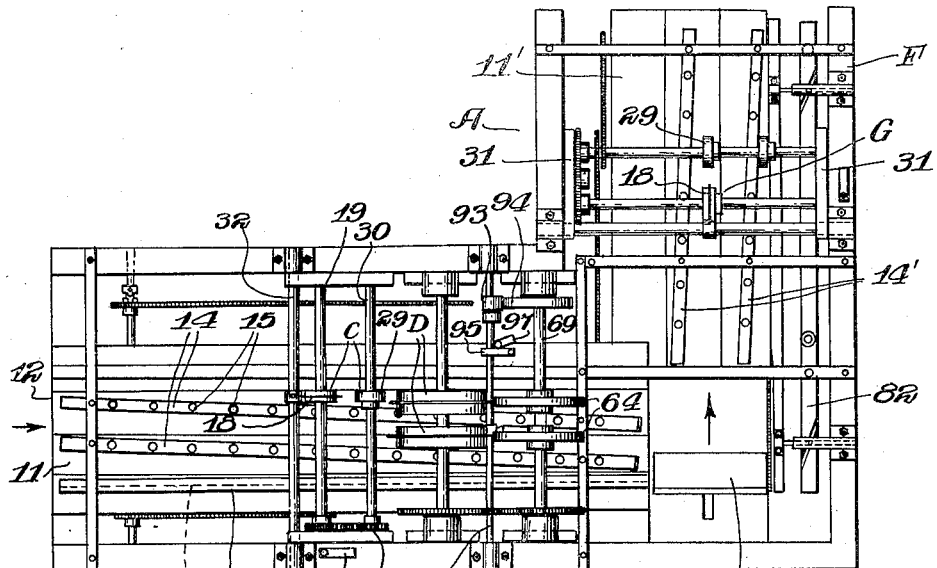
Figure 1 is a plan view of my automatic perforating machine.
Figure 2:
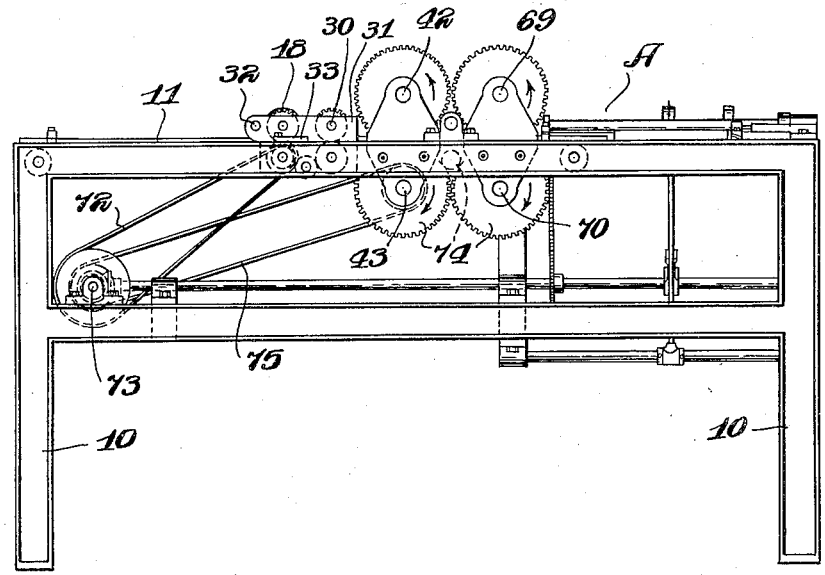
Figure 2 is a side view of the same.

My automatic perforating machine A is formed with supporting legs 10 which are adapted to support the operating bed 11 on which the sheets B are adapted to be carried. The sheets B are fed in any suitable manner by an automatic sheet feeding mechanism, not shown, or by any other suitable means, onto the bed at the receiving end 12. Conveyor belts 13 which lie directly below the members 14 in which the bearing balls 15 are freely disposed carry the sheets along on the bed 11 to either of the perforating mechanisms C or D, which will be later described. The bearing balls rest by gravity against the conveyor belts so that as the sheet B passes onto the table 11 under the members 14, the bearing balls 15 will hold the sheets against the conveyor belts to carry the same through the machine A.

The guide 16 extends longitudinally along the table 11 and is adjustably positioned so as to act as a guide for the sheets B. This guide is provided with a slot 17 more clearly illustrated in Figure 5, so that the edge of the sheets B may extend into this slot forming a guide means of holding the edge of the sheet as it is carried along the work table 11. The conveyor belts 13 as well as the members 14 with the bearing balls 15 are disposed angularly in relation to the guide 16 so that as the sheets B are carried along the table 11 they will be caused to be urged towards the guide 16 and in this manner keeping the sheets B aligned against the guide 16 to properly position the sheets in relation to either the perforating mechanism C or D.

Figure 10:
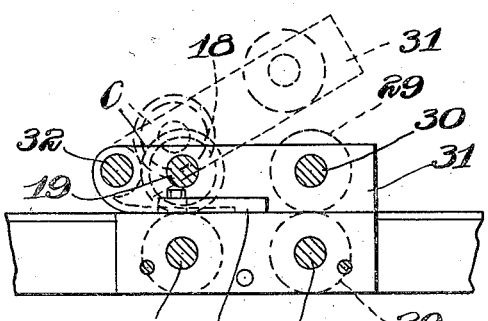
Figure 10 illustrates a detail of the supporting means for the small perforators of my machine, showing in dotted outline the upper wheels elevated.
Figure 11:
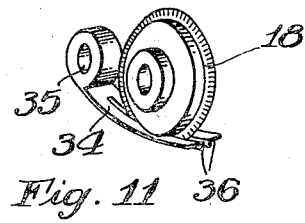
Figure 11 is a perspective detail of the small perforating wheel and the stripping shoe associated therewith.
Figure 12:
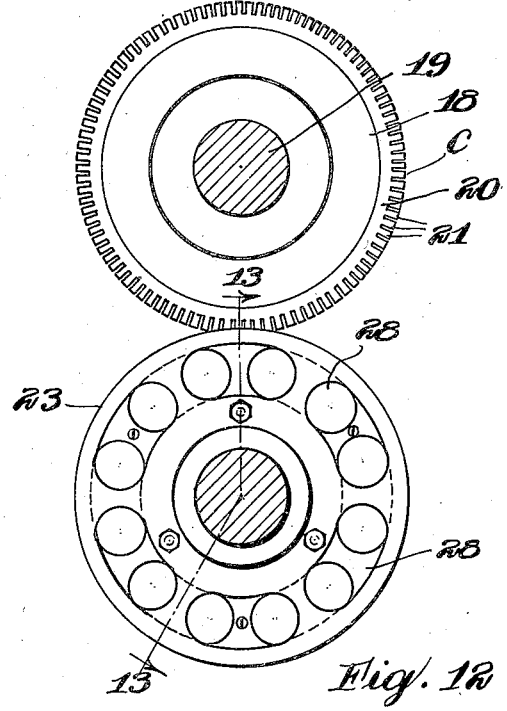
Figure 12 is an enlarged view of the small perforating wheel and rotary die associated therewith.

The perforating mechanism C includes the small perforating wheel 18 which is carried on the shaft 19, as illustrated in Figures 1, 10 and 12, Figure 12 illustrating an enlarged formation of the same to more fully disclose the formation of the cutting teeth of the perforating wheel 18. A portion of this wheel is also illustrated in section in Figure 13.

Figure 13:
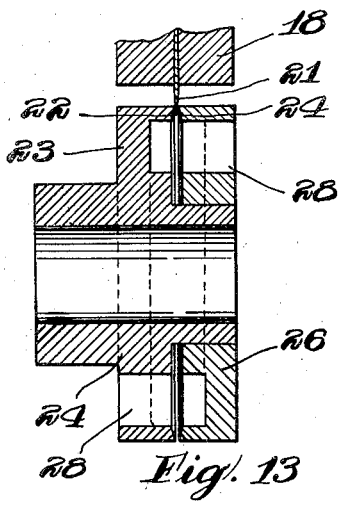
Figure 13 is a detail showing a portion of the small perforating wheel and the die as in section on the line 13—13 of Figure 12.

The perforating wheel 18 is formed with a cutting blade 20 having a series of cutting or perforating teeth 21 formed in the manner illustrated in Figures 12 and 13. These teeth 21 are spaced slightly apart and have a square cutting end in the form of a sharp tapered blade as is illustrated in Figure 13, which extends into the slot 22 of the die wheel 23, as illustrated in Figure 13. The die wheel 23 is formed with a peculiar slot 22 wherein the inner portion is beveled away at 24 to provide a clearing space for the teeth 21 of the perforating wheel 18 in perforating the sheets as they pass under the same. Any lint-like particles which may come from the slitting of the sheets B as they are perforated by the teeth 21 will quickly and readily clear out of the enlarged or beveled opening 24 of the die wheel 23.

The die wheel 23 is made up of two parts, one portion 24 of which forms the supporting collar which is mounted upon the shaft 25 which is diametrically disposed directly beneath the shaft 19, while the other collar portion 26 fits onto the portion 24 so as to adjust the width of the slot 22 into which the teeth 21 operate.

The portion 24 and the portion 26 of the die wheel 23 are formed with alternately disposed openings 28 so that the lint may be carried out of the beveled portion 24 of the slot 22, away from the outer edge of the slot 22 and below the same. This leaves the slot 22 open at all times so that the teeth 21 may drive down into the same through a sheet which may extend over the outer surface of the wheel 23 when the machine A is in operation and the sheets B are carried under the perforating wheel 18. The teeth 21 of the perforating wheel 18 act to cut slits in the sheet B in a manner to form the perforating portion or line dividing the sheet as will be more fully hereinafter set forth. Directly adjacent and positioned in line in travel of the sheets from the perforating wheel 18, I provide a pair of rollers 29 which are mounted upon shafts 30 and 30', respectively. These rollers act to roll down or iron out the surface which has been slitted by the perforating wheel 18. In this manner, the sheets B are squeezed flat along the perforating line so that the sheets will lie virtually flat, one upon the other when stacking. The rollers 29 are smooth flat rollers and are of the same nature and positioned so that they will bear one against the other to flatten the sheets on the perforating line as they pass between the same. The shafts 19 and 30 are carried by hinged bearing boxes 31 which are pivotally supported near the ends of the shaft 32, as illustrated in Figures 1 and 10. The purpose of hingedly supporting the shafts 19 and 30 in this manner is so that they can be elevated when the perforating mechanism C is not desired for use in the operation of the machine A. In this case, the boxes 31 are raised, as illustrated in dotted lines in Figure 10, and the lug 33 is moved into position under the edge of one of the boxes 31 so as to hold the same elevated thereby holding the perforating mechanism C out of operation.

I provide a stripper shoe 34, the collar 35 of which is carried by the shaft 32 and which is adapted to support the stripper shoe 34 with its bifurcated end 36 extending on either side of the perforating blade 20 adjacent to the perforating teeth 21. The ends of the bifurcated portion 36 of the shoe 34 extends beyond the wheel 18 so as to insure stripping of the sheets B from the perforating wheel 18 as they pass beneath the same. The perforating mechanism C is employed ordinarily singularly to perforate sheets requiring a continuous line or lines of perforation. When it is desired to make a series of perforated lines of a definite length on the sheet, I employ the perforating mechanism D, and the mechanism C is held out of operating position by the lug 33. Either of the perforating mechanisms C or D are adjustable in the machine A to the desired position to perforate the sheets as they pass through the machine A.

Figure 3:
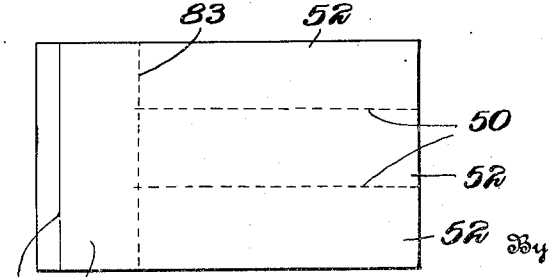
Figure 3 illustrates a sheet perforated automatically upon my machine to illustrate for convenience in describing the operation of my machine the relative position of the lines of perforation.

The perforating mechanism D includes two or more perforating wheels 40 with the die wheels 41 which are mounted upon the shafts 42 and 43, respectively, in the machine A, positioned diametrically one above the other in a similar manner as the perforating wheel 18 and the die wheel 23 are positioned in the mechanism C. The perforating wheel 40 includes the wheel member 44 which is formed with the shaft engaging collar 45 and an outer threaded collar portion 46 to which the clamping ring 47 is threaded and adapted to engage to hold the perforating blade 48 which is formed with the perforating teeth 21 of the same nature as the teeth in the blade 20. The blade 48 may be in the form of a segment of a circle, as indicated in Figure 6, to provide the desired length to the blade 48 so that as the sheet B passes beneath the wheel 40 only a portion of the sheet will be perforated, depending on the length of the blade 48. The reason for a perforating wheel of this nature is to provide a means of forming the perforated lines 50 which extend longitudinally in the sheet B, as illustrated in Figure 3. These perforating lines 50 should extend only up to the stub portion 51 of the sheet B and in forming the longitudinally extending perforations 50, the individual divisions such as 52 are formed in the sheet B. All of these individual divisions 52 are connected to the stub portion 51.

The wheel 41 is formed in segments, one portion 53 having the shaft engaging collar 54 and being adapted to carry one of the die rings 55 in the periphery thereof, while the other portion 56 is held by the screws 57 adjustably secured to the portion 53. Set screws 58 are carried by the portion 53 and are adapted to form adjustable stops between the portions 53 and 56 which operate in conjunction with the screws 57 in adjusting the portions 53 and 56 of the wheel 41 so as to provide the desired size slot 59 between the ring 55 carried by the portion 53 and the ring 60 carried by the portion 56 of the wheel 41. The rings 55 and 60 form the die rings of the wheel 41 and may be secured in any suitable manner to the respective portions 53 and 56. It is desirable, however, that these rings 55 and 60 be held removably so that they may be reversed for use by transferring them from the portion 53 to the portion 56. This permits the rings 55 and 60 to be used longer because when their edges which form the slot 59 become worn, they must be changed or replaced to give the desired operation to the perforating mechanism D. The rings 55 and 60 are formed beveled on each side so that the inner portion of the slot 59 is flared out or beveled at 61, similar to the formation of the die wheel 23 in the flared portion 24 of the slot 22. This provides a clearing space beneath the upper working edges of the rings 55 and 60 to permit the escape of lint or fine particles which may break away from the sheet in perforating the same by the teeth 21 of the blade 48.

In this die wheel 41 I also provide openings 62 in the sides of the members 53 and 56 so that from the space 63 between the portions 53 and 56, the lint or particles may escape so as to keep the passageway 59 clean at all times during the operation of the perforating mechanism D. It is desirable that the slot 59 be kept clean at all times. The particles which may come from the sheets being perforated by the mechanism C or D of my machine A will be so fine as to be virtually dust, and will readily fall out of the openings in the wheel 41. Heretofore, in other perforating mechanisms, where a piece is cut out of the sheet in perforating the same, a much greater amount of waste material must be carried away from the perforating wheel and mandrel. By my particular form of slitting perforator rather than a punch perforator, I accomplish a much better result with less difficulty of the perforator becoming clogged or operated irregularly in the operation of a machine of this character.

In conjunction with the perforating wheel 40 and the die wheel 41, I provide a roll-down wheel 64 which carries an adjustable contacting plate 65 which is virtually of the same length as the blade 48 or possibly just slightly longer so as to act in a manner to roll down the sheet B along line 50 where it has been perforated by the blade 48. Thus the wheel 64 is formed of two portions 66 and 67, between which the plate member 65 is adjustably clamped. With this plate 65 projecting from the surface of the wheel 64, the sheets B may be contacted to roll the same down flat only over the portion perforated by the blade 48. The plate 65 is adapted to contact with the wheel 68 which is positioned directly below the wheel 64. The wheel 64 is carried upon the shaft 69 while the wheel 68 is carried upon the shaft 70. For each perforating wheel 40 in the machine A I provide a roll-down set of wheels 64 and 68. Thus as the sheet B is passed beneath the wheels 40 it is immediately rolled down by the wheels 64 and 68 along the line of perforation. This keeps the sheets B flat along the line of perforation so that they can be more easily stacked in forming books or piles after they have passed through the machine A.

The shafts 19 and 30 as well as the shafts 25 and 30' in the perforating mechanism C are operated in unison by the train of gears 71 positioned at one end of the shafts in the frame of the machine A. This train of gears is operated by the drive chain 72 from the driving shaft 73. A similar chain of gears 74 which intermesh drive the shafts 42 and 43 and the shafts 69 and 70, and this chain of gears is operated by the drive chain 75 from the operating shaft 73.

The frame of the machine A is formed so that one end portion F extends out transversely and is provided with members 14' which are positioned directly above the carrier belts similar to the belts 13. These members 14' have the bearing balls 15 which bear down against the belts below the same and the belts below these members 14' being virtually of the same width as the members 14', do not show in the drawings, however, these belts operate to carry the sheet along the portion F beneath the members 14' in the same manner as the sheets B are carried beneath the members 14 as the sheets are carried along the bed 11 of the machine A when they are fed into the same. The bed 11' of the portion F is in line with the bed 11 in the machine A and when the sheets B come from the perforating mechanism C or D, they are carried onto a booster plate 76 which is operated by the oscillating arm 77 controlled by the cam 78. Adjacent the booster plate 76 I provide a channel-shaped guide 79 which is adjustably supported by the shafts 80 from which depends a pin 81 which engages in a cam slot in the cam bar 82 so that upon movement of the cam bar 82, the guide 79 may be adjusted toward or away from the booster plate 76.

Thus when the sheets B come from the carrier belts 13 after they have been perforated either by the mechanism C or D, they are carried onto the booster plate 76 and against the guide 79. The sheets are then pushed by the booster 76 into position to be carried under the members 14' by the carrier belts directly below the same, with one edge sliding along in the guide 79 to hold them in adjusted position while the sheets pass along the portion F of the machine A.

In the portion F of the machine A I provide a perforating mechanism G which is of the same nature as the perforating mechanism C, using virtually the same arrangement of parts so that I will designate these parts by the same numbers, to show their relative position one to the other. This perforating mechanism G employs the hinged bearing boxes 31 at the ends of the supporting shafts 19 and 30, so that the perforating wheel 18 of the same may be lifted out and held by the lug 33 out of operative position. The purpose of this perforating mechanism G is to place the transverse perforation 83 at the ends of the stub 51 in the sheet B to complete the formation of a series of sections such as 52, which are divided by the perforations 50 longitudinally, one from the other. The transverse perforation 83 intersects the ends of the perforations 50 at the stub end so that a complete joining of the perforations 50 and 83 is accomplished to form the sections 52 in the sheet B.

Figure 14:
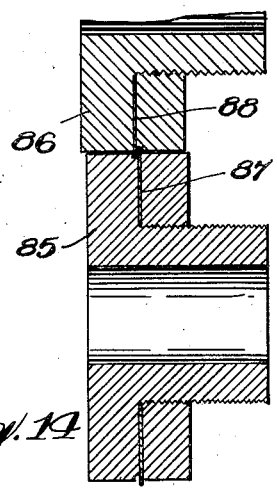
Figure 14 is an enlarged sectional view of a detail, showing the manner in which an offset score line is formed in the sheets as they automatically pass through my perforating machine.
Figure 15:
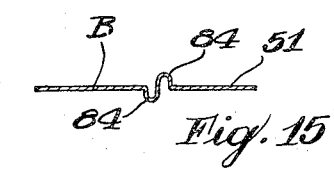
Figure 15 is an enlarged detail of a portion of the sheet to illustrate the offset score line formed in the sheets on my machine.

If a series of sheets such as B, are to be bound into a book, it is preferable to provide an offset score line 84 along the binding edge of the stub portion 51. This I accomplish by the offset score wheels 85 and 86 which are provided with the scoring blades 87 and 88 held in the wheels 85 and 86, as illustrated in Figure 14. The blades 87 and 88 are offset so as to form the offset score lines 84 in the sheet B at the binding edge of the stub 51. This forms a score line in the stub which permits the sheets to be bound so that they will fold either way without bulging at the fold and which permits the book to lie flat when opened. The score wheel 86 is carried upon the shaft 30 while the score wheel 85 is carried upon the shaft 30' which is positioned directly below the shaft 30. These score wheels 85 and 86 are adjustable and adapted to operate in conjunction with the perforating mechanism G.

I provide a registering stop mechanism H which operates to register the sheets B in relation to the perforating wheels 40. This mechanism is positioned between the wheels 40 and the roll-down wheels 64. I have illustrated an enlarged detail of this mechanism in Figure 4. The mechanism H is provided with an adjustable stop finger 89 which depends into the groove 90 in the table 11 and which is adapted to stop the sheets B momentarily at the starting of the longitudinal perforations 50 in the same. The finger 89 is pivotally carried upon the shaft 91 and is adapted to be operated by the lever 92 which carries the cam wheel 93 operated by the cam 94. The cam 94 operates to raise and lower the finger 89 above the table 11 so as to permit the sheets B to pass beneath the same and on through the machine A. I provide a suitable adjusting stop carried by the arm 95 with the adjusting screw 96 for regulating the position of the finger 89 in relation to the table 11. I also provide an adjustable lug 97 adjacent the lower end of the screw 96 which may be moved under the end of the screw 96 to hold the finger 89 elevated out of operative position so that when the perforating mechanism D is not employed the sheets may pass continually on through the machine A over the table 11. The lever 92 is adapted to be spring urged by the coil spring 98 which operates to cause the rod 99 to bear with spring tension against the side of the lever 92 to normally hold the cam wheel 93 against the cam 94. When the perforating mechanism C is in operation, the registering mechanism is ordinarily inoperative and the lug 97 is moved under the adjusting screw 96 to hold the finger 89 elevated away from the table 11. This permits the sheets to pass freely uninterrupted along the table 11 of the machine A away from the perforating mechanism C.

The cam 94 is positioned to one side of the machine A as will be seen in the Figure 1, so that the cam and the levers 92 and 95 are positioned out of the line of travel of the sheets along the conveyors 13 and the holding members 14. The shaft 91 extends across the machine A and between the perforating wheels 40 of the perforator D and the roll-down wheels 64 and 68. This positions the stop finger 89 between the wheels 40 and the roll-down wheels 64 so as to register the sheets in the perforating operation.

The segmental shape of the perforating blade 48 permits the perforation of the sheets B passing through the machine A to start at a predetermined point in accordance with the setting of the blade 48 in the perforating wheels 40 and also regulates the length of perforation in the sheets B as they pass through the machine. The circumferential length of the blade 48 representing the length of the longitudinal perforations such as 50 in the sheet B and the blank space of the wheel 40 which has no perforation, provides the space in the rotation of the perforating mechanism for the registering of the sheets B by the finger 89.

In carrying out my method of perforating single sheets I have illustrated the mechanism of the machine A in its particular formation and construction, together with the arrangement of parts as shown, however, the method of perforating sheets of paper might also be carried out by other arrangement of parts in such a manner as to accomplish the same results without departing from the purpose and intent of this invention within the scope of the appending claims.

Primarily, the method consists of passing a sheet of paper along a table by suitable carriers to the perforating means which either perforates the sheet longitudinally or transversely or both, the lines of perforation being rolled flat so as to prevent the sheets from bulging when they are stacked one upon the other, also scoring the sheet so that it will fold either way when bound in a book if it is desired. All of these operations of the method are automatic so that the sheet is carried from the starting point to the finishing by the operation of the machine A. The mechanical detail of my machine for accomplishing the perforating of sheets automatically as described includes the method, and the means of slitting the sheet, rather than perforating a portion out of the sheet, by a series of slitting knives or teeth such as 21 which are very sharp on their outer edge and which are virtually rectangular in shape.

The slitting teeth which form the perforating wheel of my machine A operate in the adjustable mandrel which has a self-clearing slot and also a structure which permits interchanging the die rings for longer wear and more accurate work. With this structure I am able to perforate sheets more rapidly with a neat appearance and in an economical manner.

I claim:

1. A perforator for paper sheets and the like including, a wheel, a thin blade having a series of sharp knife-like teeth formed on the peripheral edge thereof, means for clamping said blade to said wheel, a die wheel adapted to operate with said blade to provide a working slot into which said teeth are adapted to project to perforate a sheet passing between said die wheel and said teeth, said die wheel having an adjustable working slot, and a pair of interchangeable die rings which form said slot, the inner portion of said slot between said rings relieved for clearance of lint and dust in the operation of said perforator.

2. A perforating device including, a series of sheet conveyors, a working table in which said conveyors are located, a sheet registering means for one edge thereof, said conveyors being positioned to register the sheet against said registering means by inclining towards the same, a second sheet registering means adapted to interrupt momentarily the travel of the sheet on said work table, a perforating device adapted to perforate a pre-determined length of perforation in the sheet after it has been registered on two sides, means for perforating the sheet transverse and intersecting the first perforations formed therein, and means for rolling all of the perforations flat after the formation thereof.

3. A perforating device including, a working table having an L-shaped nature, a longitudinally angularly disposed sheet conveyor in the long side of said table, a longitudinally grooved guide extending along said conveyor, an auxiliary conveyor in the short transverse portion of said table of the same formation as said first conveyor including a longitudinal grooved guide adjacent said auxiliary conveyor, a transfer means for transferring a sheet from the first conveyor to the second conveyor to cause sheets to be carried along said first guide for registry and transferred to the second conveyor and the guide associated therewith, a stop finger for registering the sheet by engaging therewith to stop the same momentarily, a perforator operable in relation to said stop finger to place a pre-determined length of perforation in a sheet passing through said device, and a perforator associated with said second conveyor, whereby sheets may be automatically perforated longitudinally and transversely.

4. A sheet perforating device including, a primary conveyor, a perforator adapted for continuous perforations, and roll-down means for flattening the perforations after formation thereof, means for shifting said perforator and roll-down means out of operative position, a perforator adapted to perforate pre-determined lengths of perforations in a sheet including two or more perforating wheels having means for detachably securing a perforating blade therein, roll-down means for each of said perforating wheels, a stop sheet registering means associated with said perforating wheels, means for holding said registering means out of operative position, and a secondary conveyor extending transversely to said first conveyor at the end thereof adapted to receive the sheets from the first conveyor, and a perforating and roll-down means in said second conveyor of the same nature as said continuous perforator including means for shifting the perforating and roll-down means out of operative position.

5. A perforating machine including, a primary conveyor, a secondary conveyor, a sheet transferring means between said conveyors to carry sheets from said primary conveyor to said secondary conveyor, sheet perforating means, means for flattening said perforations formed as a unit and positioned in each of said conveyors, means for holding each of said unit sheet perforating and flattening means out of operative position, and another sheet perforating and flattening unit in said primary conveyor operative only when said sheet perforating and flattening unit in said primary conveyor are inoperative to co-operate with said perforating and flattening unit in said secondary conveyor forming sectional sheets by longitudinal and transverse perforations.

6. A check forming machine including, primary and secondary conveyors, a sheet transferring and boosting means from said primary conveyor to said secondary conveyor, similar sheet perforating and flattening units associated in said primary and said secondary conveyors, each having means for holding said units individually out of operative position separately, and a third sheet perforating and flattening unit in one of said conveyors adapted to co-operate with the perforating unit in the other conveyor to form longitudinal and transverse perforations in a sheet to divide the same into sections.

7. A perforating device for sheets including, a wheel having a segment of a circle perforating blade, a series of teeth on said blade, a die wheel for receiving said teeth of said blade, and reversible die rings on said die wheel.

8. A die for perforator wheels including, a die wheel, a reversible die ring secured to said die wheel, a second die wheel, a second reversible die ring secured thereto, means for adjustably connecting said die wheels to space said rings apart and to provide a space therebetween, and relieved surfaces on said die rings between said rings and inwardly of the slot to provide clearance for dust and lint.

9. A die wheel for use in combination with a perforator including a pair of relatively slidable members, a bolt extending through a hole in one of said members and threadably engaging the other of said members for drawing said members together, and a bolt threadably engaging said one member and bearing against said other member for holding said members apart.

10. A die wheel for use in combination with a perforator including a hub, a wheel member integral with said hub, a second wheel member slidable on said hub, and means for releasably connecting said wheel members together and means for adjusting the same relatively transversely.

11. A die wheel for perforators including, a pair of die members, means for relatively slidably supporting said members, means connecting said relatively slidable members for securing said members directly together to provide a slot of adjustable width therebetween, and a relieved inner surface on each of said members inwardly of said slot to provide easy clearance for dust and lint passing through said slot.

12. A perforating device for sheets including, a perforating blade, a die comprising two relatively slidable members defining a slot therebetween for receiving the teeth of each blade, a transversely relieved inner surface on each of said members for clearance of dust and lint in the operation of said perforator, means connecting said members, and means for sliding one member relative to the other, transversely.

WILLIAM ROY HOTCHKISS.